(12) United States Patent
Kato

(10) Patent No.: US 7,580,162 B2
(45) Date of Patent: Aug. 25, 2009

(54) IMAGE READING APPARATUS AND READING RESOLUTION CONFIRMING METHOD

(75) Inventor: Tetsuya Kato, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1016 days.

(21) Appl. No.: 10/827,403

(22) Filed: Apr. 20, 2004

(65) Prior Publication Data

US 2004/0212845 A1    Oct. 28, 2004

(30) Foreign Application Priority Data

Apr. 24, 2003    (JP)    ............... 2003-120312

(51) Int. Cl.
*H04N 1/04*    (2006.01)
(52) U.S. Cl. .................. 358/474; 358/468; 358/444
(58) Field of Classification Search ............... 358/1.15, 358/468, 442, 474, 405, 1.2, 404, 403, 444; 348/311
See application file for complete search history.

(56) References Cited

U.S. PATENT DOCUMENTS

| | | | |
|---|---|---|---|
| 4,204,230 A * | 5/1980 | Sprague | ............... 348/311 |
| 5,420,693 A | 5/1995 | Horiuchi et al. | |
| 5,936,742 A | 8/1999 | Horiuchi et al. | |
| 6,208,436 B1 * | 3/2001 | Cunningham | ............... 358/474 |
| 7,365,889 B2 * | 4/2008 | Lay | ............... 358/506 |

FOREIGN PATENT DOCUMENTS

| | | |
|---|---|---|
| JP | A 62-194775 | 8/1987 |
| JP | A 4-4682 | 1/1992 |
| JP | A 4-304779 | 10/1992 |
| JP | A 5-227362 | 9/1993 |
| JP | A 2000-101803 | 4/2000 |
| JP | A 2002-185698 | 6/2002 |

* cited by examiner

*Primary Examiner*—King Y Poon
*Assistant Examiner*—Lennin R Rodriguez
(74) *Attorney, Agent, or Firm*—Oliff & Berridge, PLC

(57) ABSTRACT

An image reading apparatus including an image reader that outputs an image signal representing the read image to a signal line, and a controller which includes an indicating portion indicating a first reading resolution to the image reader, so that the image reader reads the image at the first reading resolution. The image reader includes a confirmation-signal producing portion which produces a resolution confirmation signal representing a second reading resolution which should be identical with the first reading resolution indicated by the controller. The controller includes a judging portion which receives the resolution confirmation signal from the image reader, and judges whether the second reading resolution represented by the received resolution confirmation signal is identical with the first reading resolution indicated to the image reader. The controller therefore judges whether the first reading resolution has normally been indicated to the image reader.

14 Claims, 10 Drawing Sheets

IMAGE READING APPARATUS AND READING RESOLUTION CONFIRMING METHOD

BACKGROUND OF THE INVENTION

1. Field of the Invention

The present invention relates to an image reading apparatus, a reading resolution confirming method, and an image reader, and particularly to the art of changing a reading resolution of the image reader that may be employed by the image reading apparatus and may be used in the reading resolution confirming method.

2. Discussion of Related Art

There has conventionally been known an image reading apparatus, employed by, e.g., a facsimile machine or a copying machine, that includes a contact image sensor or reader (CIS) that reads an image according to a start signal and a clock pulse signal.

In addition, there has been proposed such an image reading apparatus that can change a reading resolution of an image reader thereof that is to be used to read an image. For example, Japanese Patent Publication No. 2000-101803 discloses an image reading apparatus that can change, according to a reading resolution to be indicated to an image reader, a pulse width of a start signal, and thereby change a number of pulses of a clock pulse signal that occur while the start signal takes an ON state (i.e., a high voltage), so that the reading resolution is indicated to the image reader without using an exclusive signal line.

SUMMARY OF THE INVENTION

However, the above-indicated image reading apparatus suffers from a problem that if the reading resolution is not normally indicated or transmitted to the image reader, because of, e.g., noise, an image may not be read at the correct reading resolution.

It is therefore an object of the present invention to provide an image reading apparatus, a reading resolution confirming method, and an image reader each of which can prevent a problem that an image may be read at an erroneous reading resolution.

According to a first aspect of the present invention, there is provided an image reading apparatus, comprising an image reader which reads an image, and outputs an image signal representing the read image, to a signal line; and a controller which includes an indicating portion indicating a first reading resolution to the image reader, so that the image reader reads the image at the first reading resolution, and which receives the image signal from the image reader via the signal line, the image reader including a confirmation-signal producing portion which produces a resolution confirmation signal representing a second reading resolution which should be identical, when the first reading resolution has normally been indicated by the controller to the image reader, with the first reading resolution indicated by the controller, and outputs the resolution confirmation signal to the controller, the controller including a judging portion which receives the resolution confirmation signal from the image reader, and judges whether the second reading resolution represented by the received resolution confirmation signal is identical with the first reading resolution indicated to the image reader, and thereby judges whether the first reading resolution has normally been indicated to the image reader.

According to the first aspect of the invention, even if the first reading resolution may not have normally been indicated by the controller to the image reader, for some reason, the controller can know the fact before the image reader finishes reading the image at the erroneous reading resolution. Therefore, the controller is allowed to perform some treatment to prevent the image reader from reading the image at the erroneous reading resolution.

According to a preferred feature of the first aspect of the invention, the controller includes a controlling portion which controls, when the judging portion judges that the first reading resolution has not normally been indicated to the image reader, the image reader to stop reading the image. According to this feature, the controller can prevent the image reader from continuing reading the image at the erroneous reading resolution.

According to another feature of the first aspect of the invention, the indicating portion of the controller indicates the first reading resolution to the image reader via the signal line, and wherein the confirmation-signal producing portion of the image reader outputs the resolution confirmation signal to the controller via the signal line. According to this feature, it is not needed to employ an additional signal line to output the resolution confirmation signal. This leads to reducing the production cost of the image reading apparatus.

According to another feature of the first aspect of the invention, before the image reader outputs the image signal to the controller via the signal line, the confirmation-signal producing portion of the image reader outputs the resolution confirmation signal to the controller via the signal line. According to this feature, the controller can quickly judge whether the first reading resolution has normally been indicated to the image reader. In addition, the controller can easily distinguish the resolution confirmation signal from the image signal, and accordingly can easily extract the resolution confirmation signal only.

According to another feature of the first aspect of the invention, the image reader reads each one of a plurality of lines in the image, in a corresponding one of a plurality of image reading operations, and each time the image reader performs one of the image reading operations, the indicating portion of the controller indicates the first reading resolution to the image reader. According to this feature, the controller can control the image reader with respect to each of the respective image reading operations thereof to read the respective lines of the image.

According to another feature of the first aspect of the invention, each time the image reader performs the one of the image reading operations, the indicating portion of the controller indicates the first reading resolution to the image reader, and the confirmation-signal producing portion of the image reader outputs, to the controller, a corresponding one of a plurality of the resolution confirmation signals which represents a corresponding one of a plurality of the second reading resolutions, and the judging portion of the controller judges, when the judging portion judges that the one second reading resolution represented by the one resolution confirmation signal is not identical with the first reading resolution, whether a next one of the second reading resolutions which is represented by a next one of the resolution confirmation signals is identical with the first reading resolution, and the judging portion judges, when the judging portion judges that the next second reading resolution represented by the next resolution confirmation signal is not identical with the first reading resolution, that the first reading resolution has not normally been indicated to the image reader. According to this feature, the controller can prevent itself from jumping to the conclusion that the first reading resolution has not normally been indicated to the image reader, though the second reading resolution represented by the resolution confirmation signal may not coincide, for just a temporal reason, with the first reading resolution indicated by itself.

According to another feature of the first aspect of the invention, the controller discards, when the judging portion thereof judges that the first reading resolution has not normally been indicated to the image reader, the image signal received thereafter from the image reader. According to this feature, the controller can prevent itself from wastefully processing the image signal representing the image read at the erroneous reading resolution.

According to a second aspect of the present invention, there is provided a method of confirming that a first reading resolution has normally been indicated by a controller to an image reader, the image reader reading an image, and outputting an image signal representing the read image, to the controller, via a signal line, the controller indicating the first reading resolution to the image reader, so that the image reader reads the image at the first reading resolution, and receiving the image signal from the image reader via the signal line, the method comprising the steps of producing, with the image reader, a resolution confirmation signal representing a second reading resolution which should be identical, when the first reading resolution has normally been indicated by the controller to the image reader, with the first reading resolution indicated by the controller, and outputting the resolution confirmation signal from the image reader to the controller, and receiving, with the controller, the resolution confirmation signal from the image reader, and judging whether the second reading resolution represented by the received resolution confirmation signal is identical with the first reading resolution indicated by the controller to the image reader, thereby judging whether the first reading resolution has normally been indicated by the controller to the image reader. The method according to the second aspect of the invention can enjoy the same advantage as that of the apparatus according to the first aspect of the invention.

According to a third aspect of the present invention, there is provided an image reader, comprising a reading portion which reads an image at a first reading resolution indicated by an external device, and outputs an image signal representing the read image, to a signal line; and a confirmation-signal producing portion which produces a resolution confirmation signal representing a second reading resolution which should be identical, when the first reading resolution has normally been indicated by the external device to the image reader, with the first reading resolution indicated by the external device, and outputs the resolution confirmation signal. The image reader according to the third aspect of the invention can enjoy the same advantage as that of the apparatus according to the first aspect of the invention.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
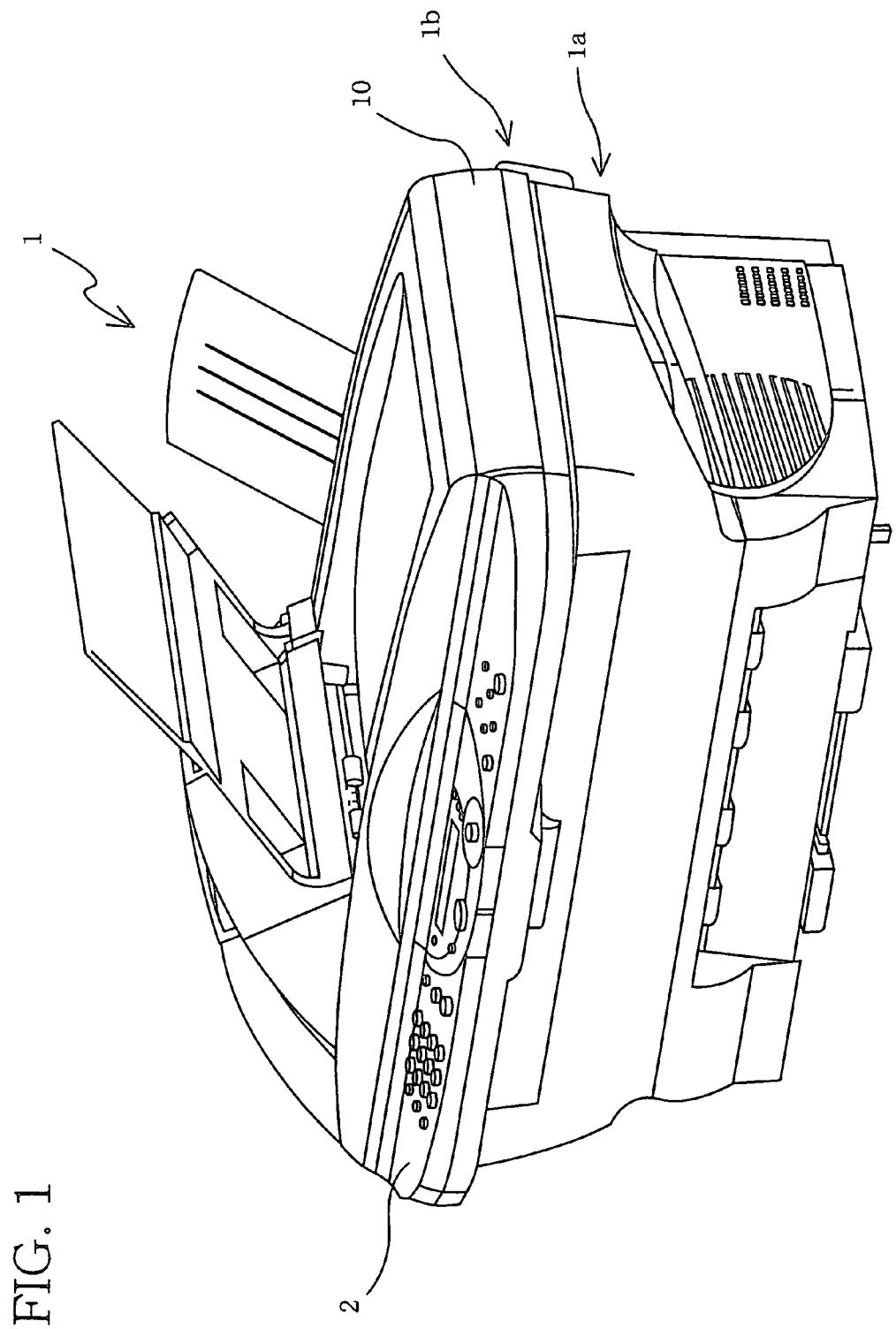
FIG. 1 is a view of a complex machine incorporating an image recording apparatus to which the present invention is applied.
Figure 2:
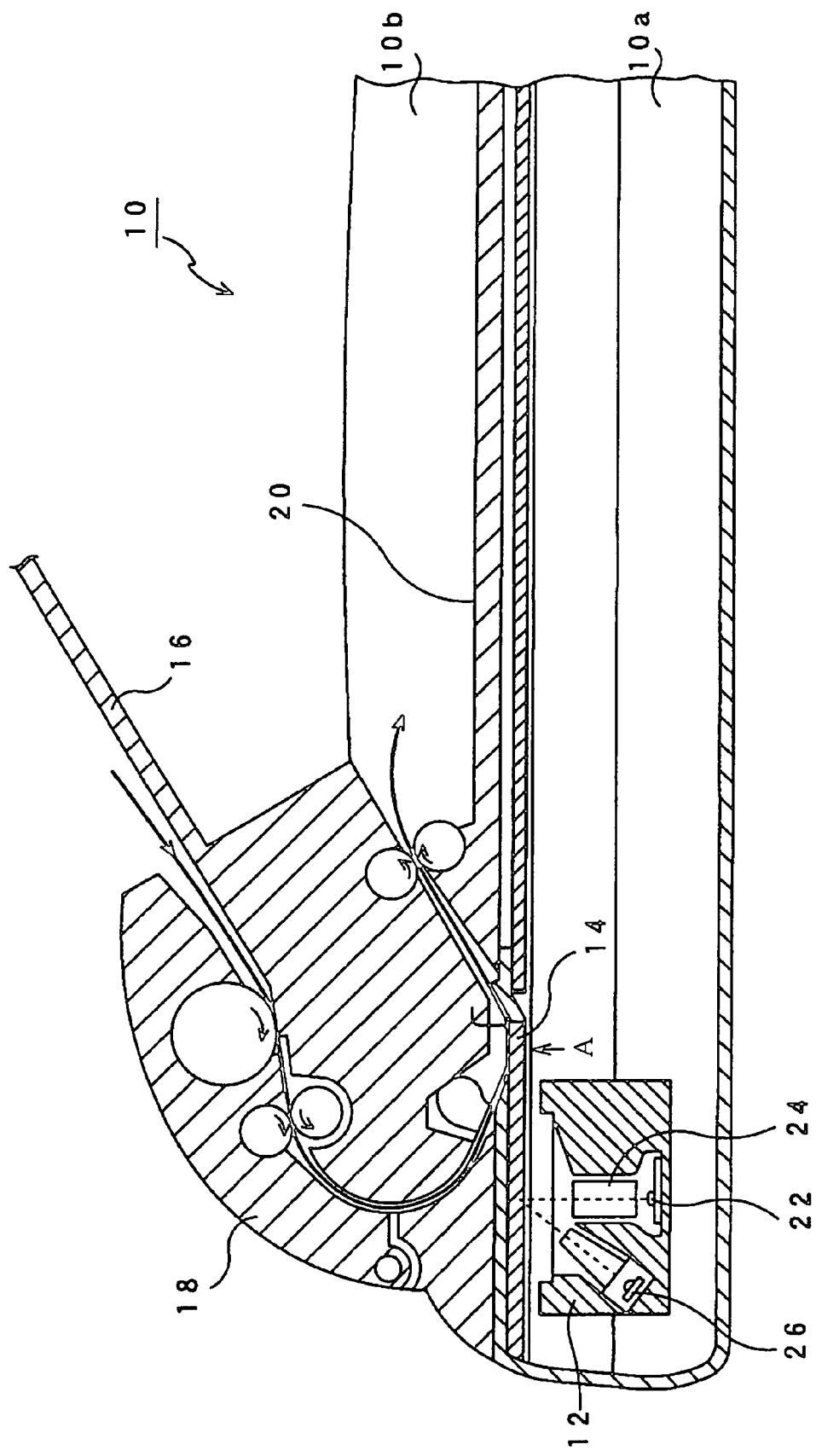
FIG. 2 is a cross-section view of the image reading apparatus.

Hereinafter, there will be described a preferred embodiment of the present invention by reference to the drawings. FIGS. 1 and 2 show a complex machine 1 incorporating an image reading apparatus 10 to which the present invention is applied.

As shown in FIG. 1, the complex machine 1 has a clam-shell structure including a lower case 1a and an upper case 1b that is attached to the lower case 1a such that the upper case 1b can be opened and closed relative to the lower case 1a. The image reading apparatus 10 is incorporated in the upper case 1b. An operation panel 2 is provided in a front-side surface of the upper case 1b. Though the complex machine 1 employs an image recording apparatus (i.e., a laser printer, not shown) in addition to the image reading apparatus 10, the image recording apparatus is not described here because it is not relevant to the present invention.

As shown in FIG. 2, the image reading apparatus 10 employs a flat bed (FB) and an automatic document feed (ADF), and has a clam-shell structure including a flat-bed portion 10a and a cover portion 10b that is attached to the flat-bed portion 10a such that the cover portion 10b can be opened and closed relative to the flat-bed portion 10a.

In the flat-bed portion 10a, there are provided a close-contact-type image sensor or reader (i.e., a reading head) 12 and a platen glass 14; and in the cover portion 10b, there are provided a document supply tray 16, a document feeding device 18, and a document discharge tray 20.

The image reader 12 includes light receiving portions (i.e., photoelectric transducers) 22, a SELFOC lens 24, and a light source 26. The light source 26 emits a light toward an image on a document present at a reading position, R, (FIG. 2), and the lens 24 converges the light reflected from the document and thereby forms the image on the light receiving portions 22. Thus, the image reader 12 reads the image on the document.

The image reader 12 is moved by a drive device, not shown, in a horizontal direction as seen in FIG. 2. When the image reader 12 reads the image on the document, the image reader 12 is moved to a position where the light receiving portions 22 thereof are located at the reading position R.

Figure 3:
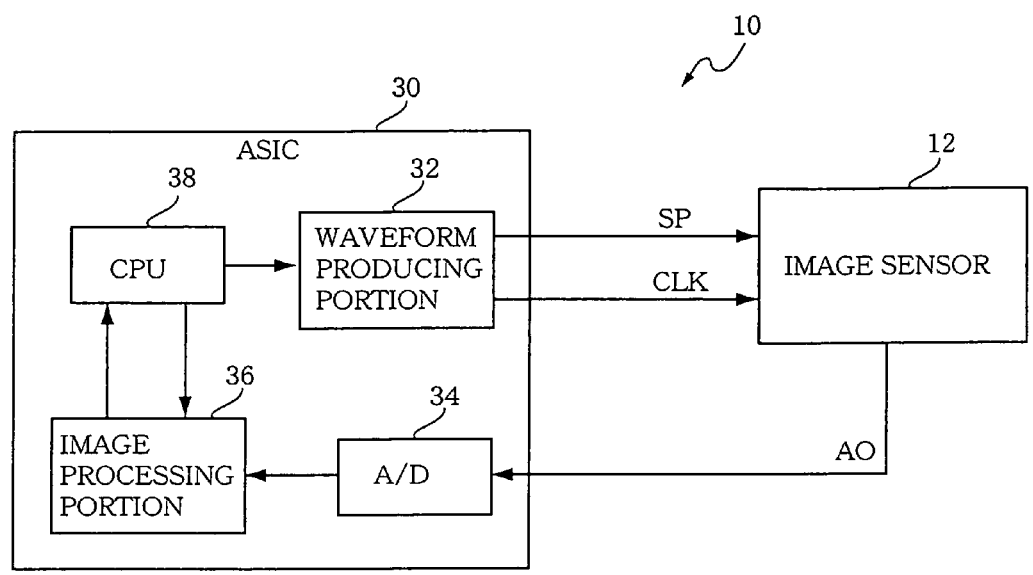
FIG. 3 is a diagrammatic view of an electrical arrangement of the image reading apparatus.

Next, there will be described an electric arrangement of the image reading apparatus 10 by reference to FIG. 3. As shown in the figure, the image reading apparatus 10 includes the image reader 12 and an ASIC (application specific integrated circuit) 30. The image reader 12 reads, based on a start signal (hereinafter, referred to as the "SP" signal), an image in synchronism with a clock pulse signal (hereinafter, referred to as the "CLK" signal), and outputs, as an output signal "AO", an image signal representing the read image. The ASIC 30 outputs the SP signal and the CLK signal to the image reader 12, receives the output signal AO from the reader 12, and processes the output signal AO, i.e., the image represented by the image signal included in the output signal AO.

Here, first, an arrangement of the ASIC 30 is explained. The ASIC 30 includes a waveform producing portion 32, an analog-to-digital (AMD) converter 34, an image processing portion 36, and a central processing unit (CPU) 38. The waveform producing portion 32 outputs the SP signal and the CLK signal. The A/D converter 34 subjects the output signal AO received from the image reader 12, to an analog-to-digital conversion. The image processing portion 36 processes an image represented by a digital image signal included in the thus converted output signal AO. The CPU 38 performs various processing operations.

Figure 4:
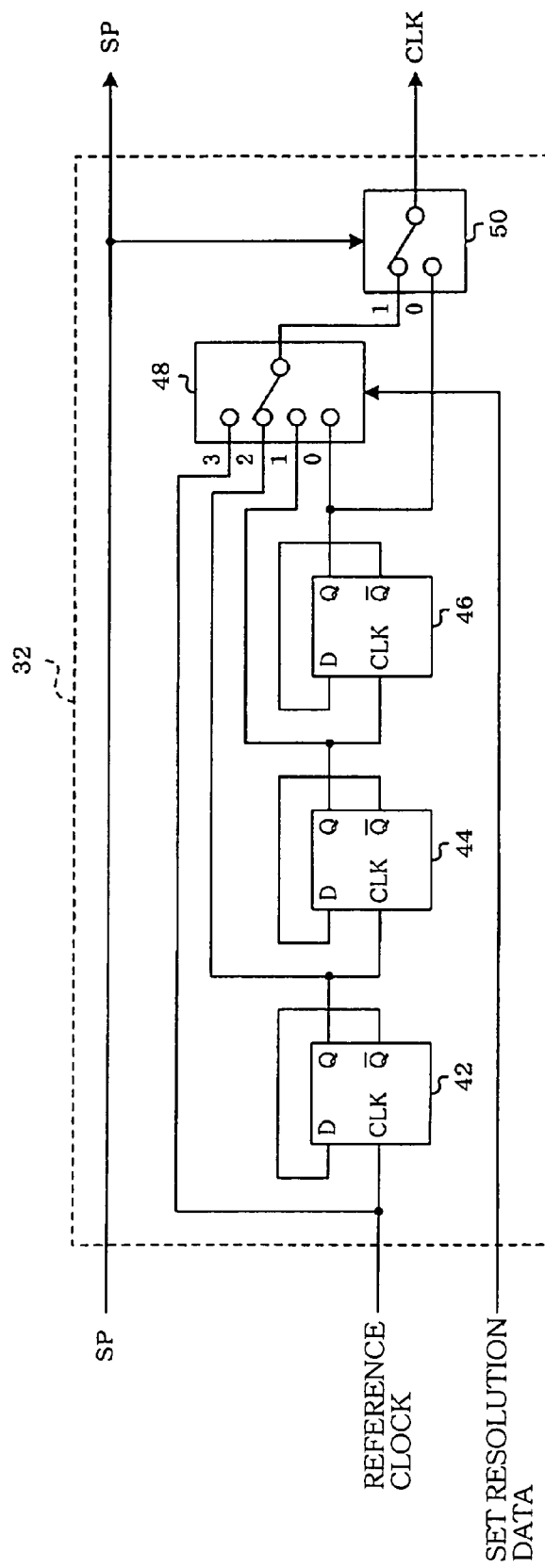
FIG. 4 is a diagrammatic view of an arrangement of a waveform producing portion of the image reading apparatus.

As shown in FIG. 4, the waveform producing portion 32 receives the SP signal that is produced by a start-signal producing portion, not shown, provided in the ASIC 30; a reference clock that is outputted from a reference-clock generator, not shown, provided in the ASIC 30 and is used as an operation clock of the CPU 38; and set resolution data that is outputted from the CPU 38. The SP signal is produced by the start-signal producing portion, based on the reference clock outputted from the reference-clock generator. The waveform producing portion 32 includes three D flip flops 42, 44, 46, and two selecting switches 48, 50. The selecting switch 48 is for selectively outputting one of four signals respectively inputted to four input terminals, 0, 1, 2, and 3, thereof; and the selecting switch 50 is for selectively outputting one of two signals respectively inputted to two input terminals, 0 and 1, thereof. As is apparent from FIG. 4, the SP signal inputted to the waveform producing portion 32 is identical with the SP signal outputted from the waveform producing portion 32.

In the waveform producing portion 32, the reference clock received from the reference-clock generator is inputted to both the input terminal 3 of the selecting switch 48 and the input terminal, CLK, of the flip flop 42. In the flip flop 42, an output signal from an output terminal, inverted Q, thereof is inputted to an input terminal, D, thereof, so that an output signal from an output terminal, Q, thereof is a pulse signal whose frequency is half a frequency of the reference clock inputted to the input terminal CLK thereof. This pulse signal is inputted to both the input terminal, 2, of the selecting switch 48 and an input terminal, CLK, of the flip flop 44.

Likewise, in the flip flop 44, an output signal from an output terminal, inverted Q, thereof is inputted to an input terminal, D, thereof, so that an output signal from an output terminal, Q, thereof is a pulse signal whose frequency is half the frequency of the pulse signal inputted to the input terminal CLK thereof, i.e., one fourth of the frequency of the reference clock. The former pulse signal is inputted to both the input terminal, 1, of the selecting switch 48 and an input terminal, CLK, of the flip flop 46.

Likewise, in the flip flop 46, an output signal from an output terminal, inverted Q, thereof is inputted to an input terminal, D, thereof, so that an output signal from an output terminal, Q, thereof is a pulse signal whose frequency is half the frequency of the pulse signal inputted to the input terminal CLK thereof, i.e., one eighth of the frequency of the reference clock. The former pulse signal is inputted to both the input terminal, 0, of the selecting switch 48 and an input terminal, 0, of the selecting switch 50.

Likewise, the selecting switch 48 selects, based on the set resolution data received from the CPU 38, one of the four signals inputted to the four input terminals 0, 1, 2, 3 thereof. More specifically described, the image reading apparatus 10 is operable by a user for selectively setting one of four reading resolutions, i.e., 1,200 dpi, 600 dpi, 300 dpi, and 150 dpi, and the CPU 38 outputs set resolution data representing the reading resolution set by the user. When the set resolution data received from the CPU 38 represents the highest reading resolution 1,200 dpi, the selecting switch 48 selects the pulse signal inputted to the input terminal 0; when the set resolution data represents the second highest reading resolution 600 dpi, the selecting switch 48 selects the pulse signal inputted to the input terminal 1; when the set resolution data represents the second lowest reading resolution 300 dpi, the selecting switch 48 selects the pulse signal inputted to the input terminal 2; and when the set resolution data represents the lowest reading resolution 150 dpi, the selecting switch 48 selects the reference clock inputted to the input terminal 3. The selecting switch 48 outputs the thus selected signal as an output signal thereof to an input terminal, 1, of the selecting switch 50.

The selecting switch 50 selects, based on the SP signal received from the start signal producing portion, one of the two signals inputted to the input terminals 0, 1 thereof, and outputs the thus selected signal as the CLK signal. More specifically described, while the SP signal takes a low voltage or level (i.e., an OFF state), the selecting switch 50 selects the signal inputted to the input terminal 0 thereof; and while the SP signal takes a high voltage or level (i.e., an ON state), the selecting switch 50 selects the signal inputted to the input terminal 1 thereof.

Figure 5:
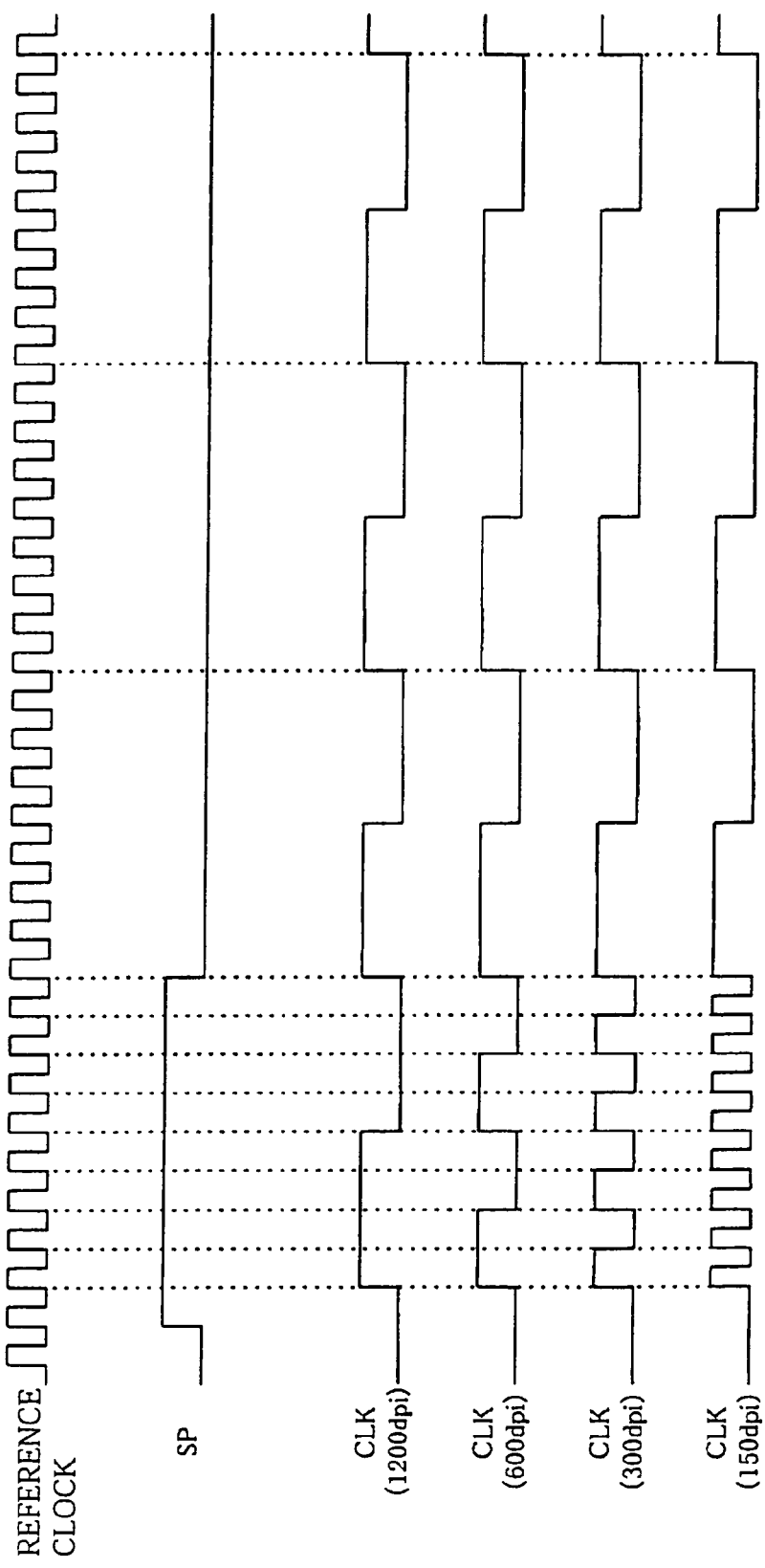
FIG. 5 is a view for explaining respective waveforms of output signals from the waveform producing portion of FIG. 4.

That is, while the SP signal takes the high level, the selecting switch 50 selects the signal inputted to the input terminal 1 thereof, and accordingly outputs, as the CLK signal, the signal received from the selecting switch 48. More specifically described, as shown in FIG. 5, when the set resolution data represents the reading resolution 1,200 dpi, the selecting switch 48 selects the input terminal 0 and outputs, as the CLK signal, the pulse signal whose frequency is one eighth of the frequency of the reference clock.

Likewise, when the set resolution data represents the reading resolution 600 dpi, the selecting switch 48 selects the input terminal 1 and outputs, as the CLK signal, the pulse signal whose frequency is one fourth of the frequency of the reference clock; when the set resolution data represents the reading resolution 300 dpi, the selecting switch 48 selects the input terminal 2 and outputs, as the CLK signal, the pulse signal whose frequency is half the frequency of the reference clock; and when the set resolution data represents the reading resolution 150 dpi, the selecting switch 48 selects the input terminal 3 and outputs, as the CLK signal, the reference clock as it is.

In the image reading apparatus 10, a pulse width of the SP signal, i.e., a time duration of the high level of the SP signal is constant, and a number of pulses of the CLK signal that are outputted during the constant time duration of the high level of the SP signal, i.e., a number of pulse falls of the CLK signal that occur during the constant time duration represents the set reading resolution. In the present embodiment, when the reading resolution is 1,200 dpi, the number of pulse falls or fall of the CLK signal during the time duration of the high level of the SP signal is 1; when the reading resolution is 600 dpi, the number of pulse falls of the CLK signal during the time duration is 2; when the reading resolution is 300 dpi, the number of pulse falls of the CLK signal during the time duration is 4; and when the reading resolution is 150 dpi, the number of pulse falls of the CLK signal during the time duration is 8.

Meanwhile, while the SP signal takes the low level, the selecting switch 50 selects the signal inputted to the input terminal 0 thereof, and accordingly outputs, as the CLK signal, the pulse signal whose frequency is one eighth of the frequency of the reference clock. Therefore, when the reading resolution is 1,200 dpi, the frequency of the CLK signal is not changed irrespective of whether the SP signal takes the high or low level.

The image processing portion 36 includes a memory (i.e., a line buffer, not shown) that stores the digital output signal AO converted from the analog output signal AO by the A/D converter 34; and a processor that processes the image represented by the signal AO stored by the memory.

Figure 6:
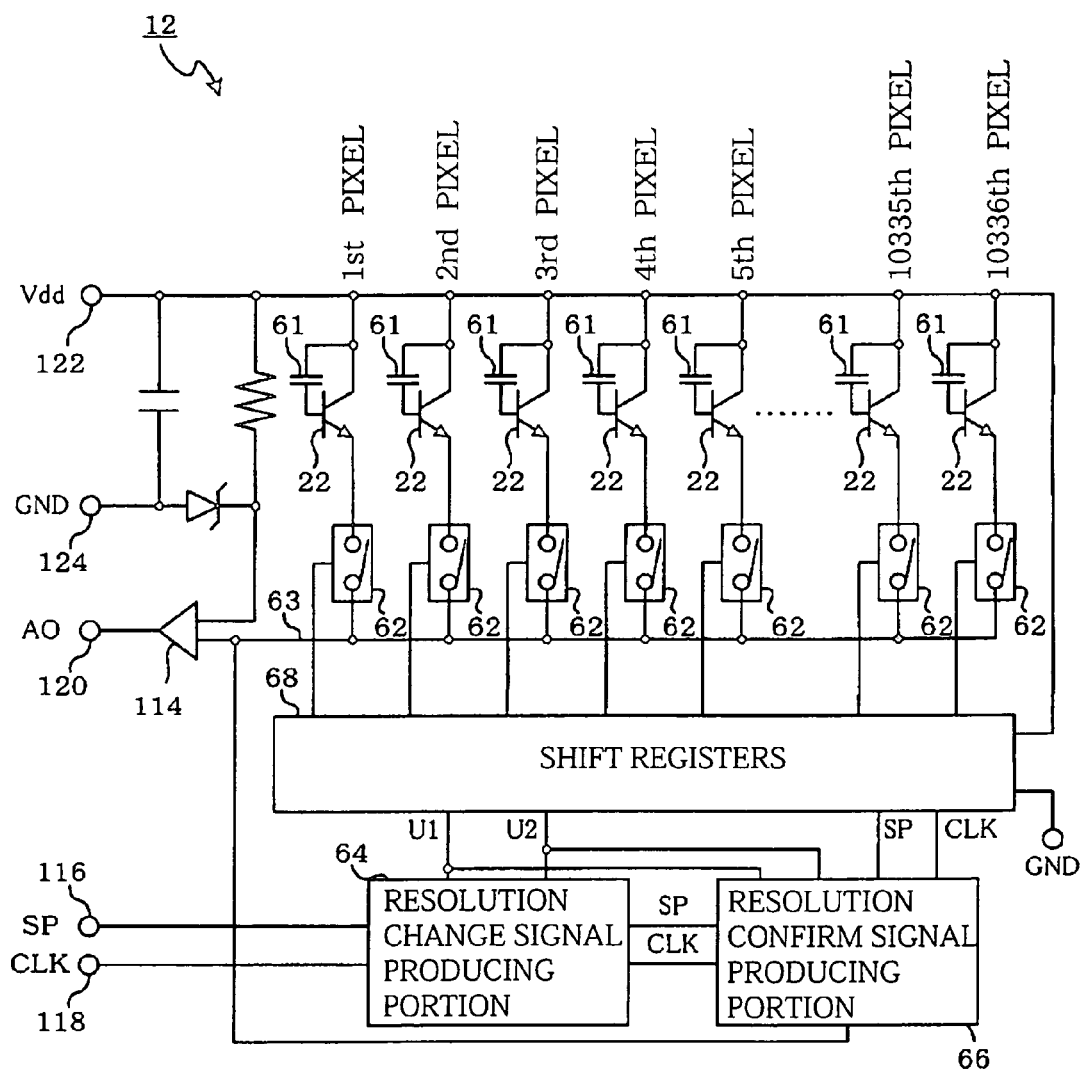
FIG. 6 is a diagrammatic view of an arrangement of an image reader of the image reading apparatus.

Next, an arrangement of the image reader 12 will be described. As shown in FIG. 6, the image reader 12 includes a plurality of photoelectric transducers (e.g., phototransistors) 22, 22, ... that are arranged along a straight line; and a plurality of switching elements (i.e., channel selecting switches) 62, 62, ... that correspond to the photoelectric transducers 22, respectively, and each of which connects, and disconnects, a corresponding one of the photoelectric transducers 22 to, and from, an output signal line 63. In addition, the image reader 12 includes a resolution change signal producing portion 64, a resolution confirm signal producing portion 66, and shift registers 68. The resolution change signal producing portion 64 produces two resolution change signals, U1, U2, based on the SP signal received via an SP terminal 116 thereof from the ASIC 30 and the CLK signal received via a CLK terminal 118 thereof from the ASIC 30. The resolution confirm signal producing portion 66 produces, based on the resolution change signals U1, U2, a resolution confirm signal, and outputs the thus produced resolution confirm signal as part of the output signal AO to the ASIC 30 via the output signal line 63 and an AO terminal 120. The shift registers 68 control, according to a control pattern corresponding to the resolution change signals U1, U2, the respective switching operations of the switching elements 62 that are for connecting, and disconnecting, the corresponding photoelectric transducers 22 to, and from, the output signal line 63. The image reader 12 additionally includes a Vdd terminal 122 to which a source voltage, Vdd, is applied; and a GND terminal 124 that is grounded.

Each of the photoelectric transducers 22 is connected to a capacitor 61 and, after the each transducer 22 converts a light (i.e., a light signal) reflected from a document, into electric charges (i.e., an electric signal), the each transducer 22 stores the electric charges in the corresponding capacitor 61. In the present embodiment, the image reader 12 employs 10,336 photoelectric transducers 22 that are arranged on a straight line in a density corresponding to the reading resolution 1,200 dpi and cooperate with each other to read each line in an image on the document.

Figure 7:
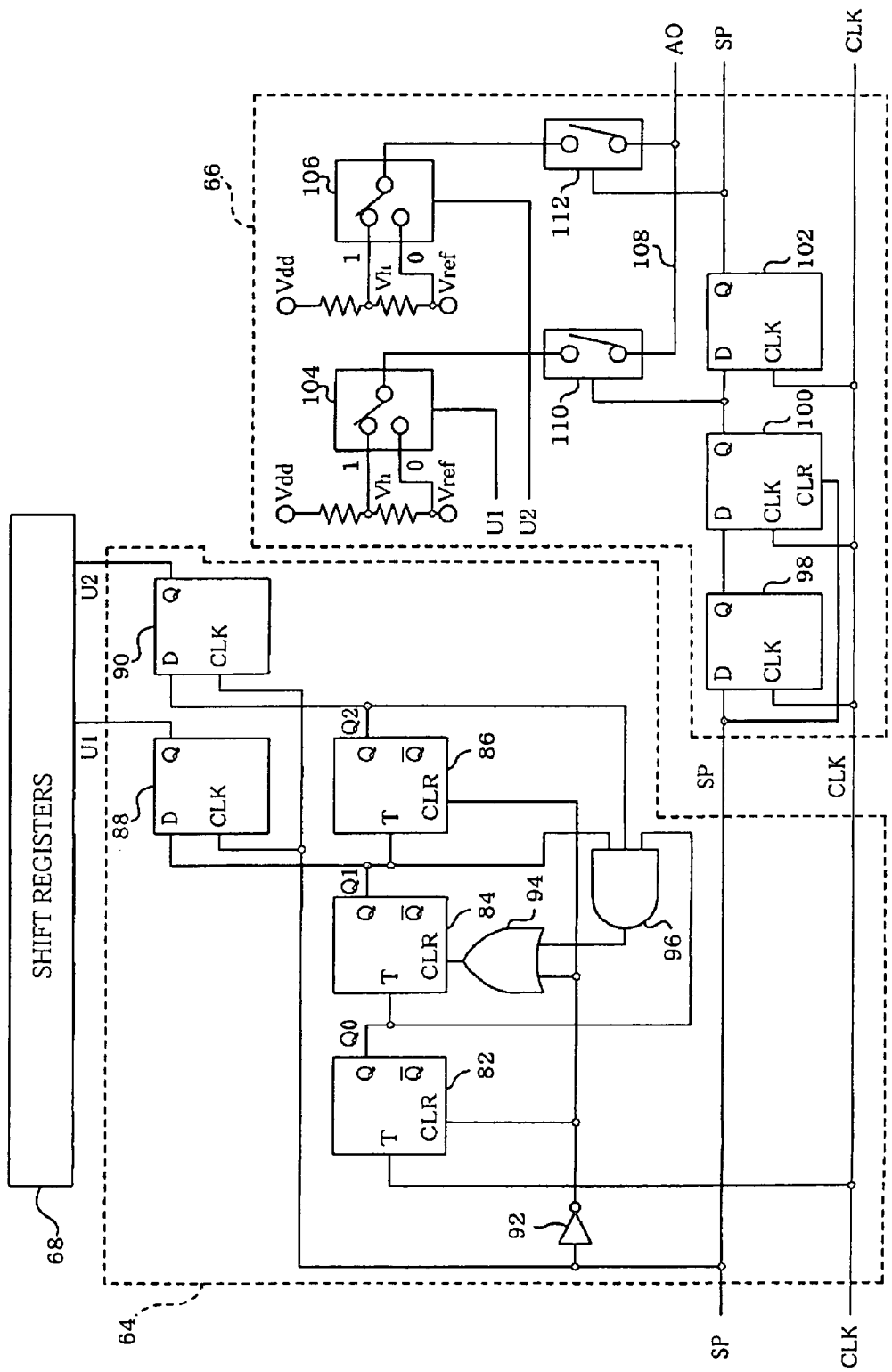
FIG. 7 is a diagrammatic view of respective arrangements of a resolution change signal producing portion and a resolution confirm signal producing portion of the image reading apparatus.

As shown in FIG. 7, the resolution change signal producing portion 64 produces the resolution change signals U1, U2, based on the SP signal and the CLK signal received from the ASIC 30, and outputs the resolution change signals U1, U2, the SP signal, and the CLK signal. The resolution change signal producing portion 64 includes three T flip flops 82, 84, 86, and two D flip flops 88, 90. As is apparent from FIG. 7, the SP signal and the CLk signal, inputted to the resolution change signal producing portion 64, are identical with the SP signal and the CLK signal, outputted from the same 64, respectively.

In the resolution change signal producing portion 64, the SP signal received from the ASIC 30 is inputted to respective input terminals, CLK, of the two flip flops 88, 90, and also inputted to respective input terminals, CLR, of the three flip flops 82, 84, 86 each via a NOT circuit 92. In particular, the SP signal is inputted to the flip flop 84 via an OR circuit 94 following the NOT circuit 92.

The CLK signal received from the ASIC 30 is inputted to an input terminal, T, of the flip flop 82. An output signal Q0 from an output terminal, Q, of the flip flop 82 is inputted to both an input terminal, T, of the flip flop 84 and an AND circuit 96. An output signal Q1 from an output terminal, Q, of the flip flop 84 is inputted to an input terminal, T, of the flip flop 86, the AND circuit 96, and an input terminal, D, of the flip flop 88. An output signal Q2 from an output terminal, Q, of the flip flop 86 is inputted to the AND circuit 96 and an input terminal, D, of the flip flop 90. Thus, the AND circuit 96 receives the respective output signals from the flip flops 82, 84, 86 and, when all those output signals Q0, Q1, Q2 take respective high levels, the AND circuit 96 outputs an output signal taking a high level. The output signal from the AND circuit 96 is inputted to the OR circuit 94.

An output signal, U1, from an output terminal, Q, of the flip flop 88 and an output signal, U2, from an output terminal, Q, of the flip flop 90 are inputted as the resolution change signals U1, U2 to the shift registers 68. Thus, the resolution change signal producing portion 64 is arranged such that while the SP signal takes the low level, the flip flops 82, 84, 86 are each in a reset state and the resolution change signals U1, U2 are both at zero level (0).

Then, while the SP signal takes the high level, the output signal Q0 from the output terminal Q of the flip flop 82 takes respective levels of 1, 0, 1, 0, 1, ... in the order of description at respective timings when the respective pulses of the CLK signal fall. In addition, the output signal Q1 from the output terminal Q of the flip flop 84 takes respective levels of 1, 0, 1, 0, 1, ... in the order of description at respective timings when the respective pulses of the signal Q0 inputted to the input terminal T thereof fall. Thus, the output signal Q1 takes respective levels of 0, 1, 1, 0, 0, 1, 1, 0, ... in the order of description at the respective timings when the respective pulses of the CLK signal fall.

In addition, the output signal Q2 from the output terminal Q of the flip flop 86 takes respective levels of 1, 0, 1, 0, 1, ... in the order of description at respective timings when the respective pulses of the signal Q1 inputted to the input terminal T thereof fall. Thus, the output signal Q2 takes respective levels of 0, 0, 0, 1, 1, 1, 1, 0, ... in the order of description at the respective timings when the respective pulses of the CLK signal fall.

However, when the respective output signals Q0, Q1, Q2 from the respective output terminals Q of the flip flops 82, 84, 86 all take one (1), the output of the AND circuit 96 turns to one (1) and accordingly the output of the OR circuit 94 turns to one (1). Thus, the flip flop 84 is changed to its reset state and the output signal Q1 from the same 84 turns to zero (0). TABLE 1 shows a relationship between the number of pulse falls of the CLK signal after the CLK signal has changed from the low level to the high level, and the respective contents of the three output signals Q0, Q1, Q2. TABLE 1 shows that at the timing when the seventh pulse of the CLK signal falls, the respective contents of the three output signals Q0, Q1, Q2 are 1, 1, 1, respectively. In this case, however, the content of the output signal Q1 immediately changes from one (1) to zero (0), as explained above.

Then, when the SP signal changes from the high level to the low level, the input signal Q1 inputted to the input terminal D of the flip flop 88 is outputted as the resolution change signal U1 from the output terminal Q thereof and the input signal Q2 inputted to the input terminal D of the flip flop 90 is outputted as the resolution change signal U2 from the output terminal Q thereof. TABLE 2 shows a relationship between the number of pulse falls of the CLK signal while the SP signal takes the high level, and the respective contents of the three output signals Q0, Q1, Q2.

TABLE 1

| CLK NUMBER OF PULSE FALLS | Q0 | Q1 | Q2 |
|---|---|---|---|
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 1 | 1 |

TABLE 2

| CLK NUMBER OF PULSE FALLS | U1 | U2 | RESOLUTION (dpi) |
|---|---|---|---|
| 1 | 0 | 0 | 1,200 |
| 2 | 1 | 0 | 600 |
| 4 | 0 | 1 | 300 |
| 8 | 1 | 1 | 150 |

As explained above, the number of pulse falls of the CLK signal that occur while the SP signal takes the high level, represents the set reading resolution indicated by the ASIC 30. Thus, TABLE 2 shows that respective values 0, 0 of the resolution change signals U1, U2 corresponding to the number, 1, of pulse fall(s) of the CLK signal represents the reading resolution, 1,200 dpi; respective values 1, 0 of the signals U1, U2 corresponding to the number, 2, of pulse fall(s) of the CLK signal represents the reading resolution, 600 dpi; respective values 0, 1 of the signals U1, U2 corresponding to the number, 4, of pulse fall(s) of the CLK signal represents the reading resolution, 300 dpi; and respective values 1, 1 of the signals U1, U2 corresponding to the number, 8, of pulse fall(s) of the CLK signal represents the reading resolution, 150 dpi. According to the resolution change signals U1, U2, i.e., the reading resolution indicated by the ASIC 30, the shift registers 68 are operated. An operation of the shift registers 68 will be described in detail, later.

As shown in FIG. 7, the resolution confirm signal producing portion 66 receives, from the resolution change signal producing portion 64, the SP signal and the CLK signal, and outputs the output signal AO, the SP signal, and the CLK signal. The resolution confirm signal producing portion 66 includes three D flip flops 98, 100, 102, two selecting switches 104, 106, and two switching elements 110, 112. Each of the selecting switches 104, 106 is for selectively outputting one of the respective signals inputted to two input terminals, 0, 1, thereof; and each of the switching elements 110, 112 is for connecting, and disconnecting, an output terminal of a corresponding one of the two selecting switches 104, 106 to, and from, a signal line 108 that is connected to the output signal line 63. As is apparent from FIG. 7, the CLK signal inputted to the resolution confirm signal producing portion 66 is identical with the CLK signal outputted from the same 66.

The input terminal 0 of the selecting switch 104 receives a low-potential voltage, Vref, and the input terminal 1 of the same 104 receives a divided voltage, Vh, between a high-potential voltage, Vdd, and the low-potential voltage Vref. When the resolution change signal U1 represents the value of 0, the selecting switch 104 selects the signal inputted to the input terminal 0 thereof; and when the resolution change signal U1 represents the value of 1, the selecting switch 104 selects the signal inputted to the input terminal 1 thereof. The low-potential voltage Vref is a reference voltage for an amplifier 114 (FIG. 6) that amplifies the image signal. When the low-potential voltage Vref is inputted to the amplifier 114, the amplifier 114 outputs, as the output signal AO, a voltage corresponding to the low level of the image signal; and when the divided voltage Vh is inputted to the amplifier 114, the amplifier 114 outputs, as the output signal AO, a voltage corresponding to the high level of the image signal.

Likewise, the input terminal 0 of the selecting switch 106 receives the low-potential voltage Vref, and the input terminal 1 of the same 106 receives the divided voltage Vh. When the resolution change signal U2 represents the value of 0, the selecting switch 106 selects the signal inputted to the input terminal 0 thereof; and when the resolution change signal U2 represents the value of 1, the selecting switch 106 selects the signal inputted to the input terminal 1 thereof.

While an output signal from an output terminal, Q, of the flip flop 100 takes a high level, the switching element 110 connects the selecting switch 104 to the signal line 108; and while the output signal takes a low level, the switching element 110 disconnects the selecting switch 104 from the signal line 108. Likewise, while an output signal from an output terminal, Q, of the flip flop 102 takes a high level, the switching element 112 connects the selecting switch 106 to the signal line 108; and while the output signal takes a low level, the switching element 112 disconnects the selecting switch 106 from the signal line 108.

In the resolution confirm signal producing portion 66, the SP signal received from the resolution change signal producing portion 64, is inputted to an input terminal, D, of the flip flop 98 and an input terminal, CLR, of the flip flop 100; and the CLK signal received from the same 64 is inputted to respective input terminals, CLK, of the three flip flops 98, 100, 102.

An output signal from an output terminal, Q, of the flip flop 98 is inputted to an input terminal, D, of the flip flop 100. The output signal from the output terminal Q of the flip flop 100 is inputted to not only the switching element 110 but also an input terminal, D, of the flip flop 102. An output signal from an output terminal, Q, of the flip flop 102 is inputted to the switching element 112, and additionally the output signal is inputted, as the SP signal, to the shift registers 68.

Figure 8:
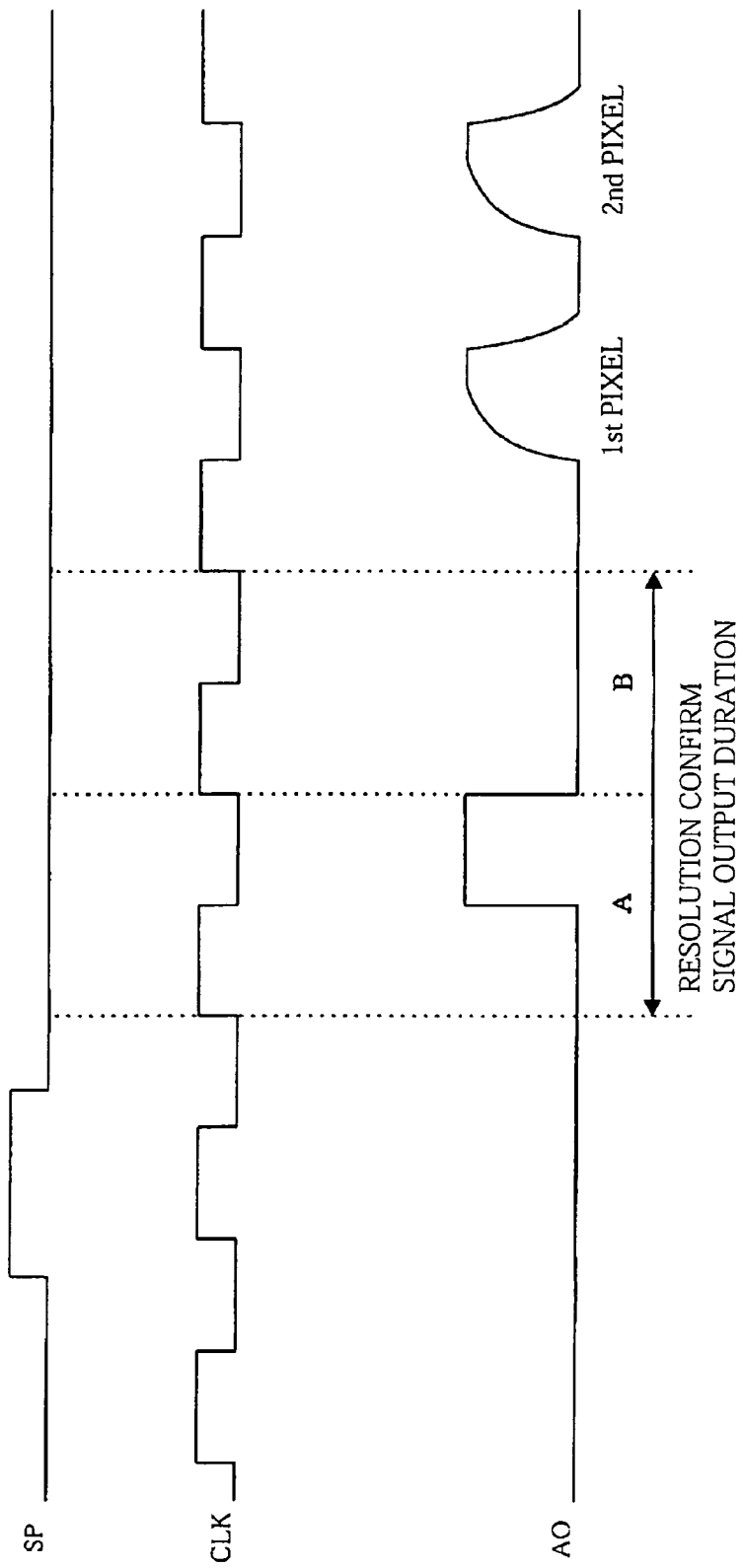
FIG. 8 is a view for explaining a waveform of an output signal from the image reader.

Since the resolution confirm signal producing portion 66 is arranged as described above, this portion 66 is operated such that while the SP signal takes the high level, the output signal from the output terminal Q of the flip flop 98 takes the high level at a timing when the CLK signal falls. However, the flip flop 100 to the input terminal D of which the above output signal is inputted is kept in a reset state while the SP signal takes the high level, so that the switching elements 110, 112 disconnect the corresponding selecting switches 104, 106 from the signal line 108. Therefore, as shown in FIG. 8, the output signal AO takes the low level while the SP signal takes the high level.

Then, after the SP signal falls down to the low level, the output signal from the output terminal Q of the flip flop 98 takes the high level at a timing when the CLK signal next falls, and simultaneously the output signal from the output terminal Q of the flip flop 100 takes the high level, so that the switching element 110 connects the selecting switch 104 to the signal line 108. Therefore, if the resolution change signal U1 represents the value of 1, the output signal AO takes the high level, as shown in FIG. 8; and, if the resolution change signal U1 represents the value of 0, the output signal AO takes the low level.

Then, at a timing when the CLK signal next falls, the output signal from the output terminal Q of the flip flop 100 takes the low level, so that the switching element 110 disconnects the selecting switch 104 from the signal line 108, and simultaneously the output signal from the output terminal Q of the flip flop 102 takes the high level, so that the switching element 112 connects the selecting switch 106 to the signal line 108. Therefore, if the resolution change signal U2 represents the value of 1, the output signal AO takes the high level; and, if the resolution change signal U1 represents the value of 0, the output signal AO takes the low level, as shown in FIG. 8. In addition, at this timing, the SP signal outputted to the shift register 68 takes the high level.

Then, at a timing when the CLK signal next falls, the output signal from the output terminal Q of the flip flop 102 takes the low level, so that the switching element 112 disconnects the selecting switch 106 from the signal line 108. In addition, at this timing, the SP signal outputted to the shift register 68 takes the low level. TABLE 3 shows a relationship between the two resolution change signals U1, U2 and two resolution confirm signal output durations, A, B, shown in FIG. 8.

TABLE 3

| U1 | U2 | RESOLUTION (dpi) | A | B |
|---|---|---|---|---|
| 0 | 0 | 1,200 | L | L |
| 1 | 0 | 600 | H | L |
| 0 | 1 | 300 | L | H |
| 1 | 1 | 150 | H | H |

As shown in TABLE 3, in the case where the resolution change signals U1, U2 represent the values 0, 0, respectively, that is, the set resolution is 1,200 dpi, the output signal AO takes the low level, L, in each of the resolution confirm signal output durations A, B. In the case where the resolution change signals U1, U2 represent the values 1, 0, respectively, that is, the set resolution is 600 dpi, the output signal AO takes the high level, H, in the output duration A, and takes the low level L in the output duration B. In the case where the resolution change signals U1, U2 represent the values 0, 1, respectively, that is, the set resolution is 300 dpi, the output signal AO takes the high level H in the output duration B, and takes the low level L in the output duration A. In the case where the resolution change signals U1, U2 represent the values 1, 1, respectively, that is, the set resolution is 150 dpi, the output signal AO takes the high level H in each of the output durations A, B.

Figure 9:
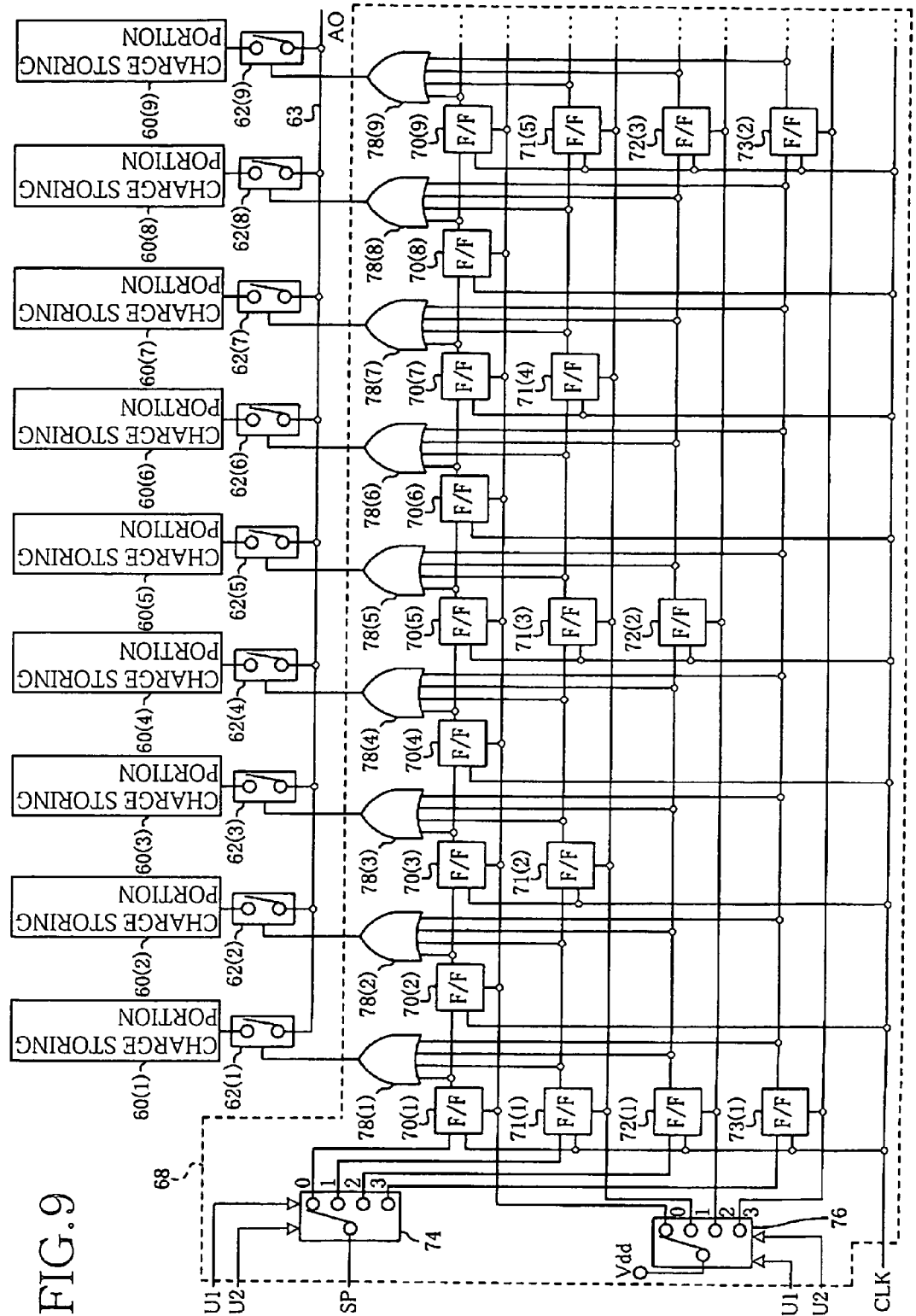
FIG. 9 is a diagrammatic view of an arrangement of shift registers of the image reading apparatus.

Next, there will be described an arrangement of the shift registers 68. As shown in FIG. 9, the shift registers 68 include D flip flops 70(1), 70(2), . . . , 70(n) (hereinafter, referred to as the first array of flip flops 70, where appropriate) corresponding, one to one, to the switching elements 62(1), 62(2), . . . , 62(n); D flip flops 71(1), 71(2), . . . , 71(n/2) (hereinafter, referred to as the second array of flip flops 71, where appropriate) corresponding, one to two, to the switching elements 62(1), 62(2), . . . , 62(n); D flip flops 72(1), 72(2), . . . , 71(n/4) (hereinafter, referred to as the third array of flip flops 72, where appropriate) corresponding, one to four, to the switching elements 62(1), 62(2), . . . , 62(n); and D flip flops 73(1), 73(2), . . . , 73(n/8) (hereinafter, referred to as the fourth array of flip flops 73, where appropriate) corresponding, one to eight, to the switching elements 62(1), 62(2), . . . , 62(n). Each of the above-described photoelectric transducers 22 and a corresponding one of the capacitors 61 cooperate with each other to provide a corresponding one of a plurality of charge storing portions 60.

In the shift registers 68, the CLK signal received from the resolution confirm signal producing portion 6 is inputted to an input terminal (CLK, not shown) of each of the flip flops 70, 71, 72, 73. An output signal from an output terminal (Q, not shown) of each of the flip flops 70, 71, 72, 73 is inputted to both corresponding one, two, four, or eight OR circuits out of OR circuits 78(1), 78(2), . . . , 78(n) corresponding, one to one, to the switching elements 62(1), 62(2), . . . , 62(n), and an input terminal (D, not shown) of another flip flop that follows the each flip flop 70, 71, 72, 73 in the same array.

In addition, the shift registers 68 include two selecting switches 74, 76. The selecting switch 74 is for receiving, at an input terminal thereof, the SP signal from the resolution confirm signal producing portion 66 and selectively outputting the received SP signal to one of four output terminals, 0, 1, 2, 3, thereof. The selecting switch 76 is for receiving, at an input terminal thereof, the source voltage Vdd to drive the flip flops 70 to 73 and selectively outputting the received source voltage to one of four output terminals, 0, 1, 2, 3, thereof.

The selecting switch 74 selects, based on the resolution change signals U1, U2 received from the resolution change signal producing portion 64, one of the four output terminals 0, 1, 2, 3 thereof. More specifically described, in the case where the resolution change signals U1, U2 represent the respective values 0, 0, i.e., the resolution of 1,200 dpi, the selecting switch 74 selects the output terminal 0, so that the SP signal is inputted to the input terminal (D, not shown) of the first flip flop 70(1) of the first array. In the case where the resolution change signals U1, U2 represent the respective values 1, 0, i.e., the resolution of 600 dpi, the selecting switch 74 selects the output terminal 1, so that the SP signal is inputted to the input terminal (D, not shown) of the first flip flop 71(1) of the second array. In the case where the resolution change signals U1, U2 represent the respective values 0, 1, i.e., the resolution of 300 dpi, the selecting switch 74 selects the output terminal 2, so that the SP signal is inputted to the input terminal (D, not shown) of the first flip flop 72(1) of the third array. In the case where the resolution change signals U1, U2 represent the respective values 1, 1, i.e., the resolution of 150 dpi, the selecting switch 74 selects the output terminal 3, so that the SP signal is inputted to the input terminal (D, not shown) of the first flip flop 73(1) of the fourth array.

Likewise, in the case where the resolution change signals U1, U2 represent the respective values 0, 0, i.e., the resolution of 1,200 dpi, the selecting switch 76 selects the output terminal 0, so that the source voltage is inputted to respective input terminals (ENB, not shown) of the flip flops 70(1), 70(2), . . . , 70(n) of the first array. In the case where the resolution change signals U1, U2 represent the respective values 1, 0, i.e., the resolution of 600 dpi, the selecting switch 74 selects the output terminal 1, so that the source voltage is inputted to respective input terminals (ENB, not shown) of the flip flops 71(1), 71(2), . . . , 71(n) of the second array. In the case where the resolution change signals U1, U2 represent the respective values 0, 1, i.e., the resolution of 300 dpi, the selecting switch 76 selects the output terminal 2, so that the source voltage is inputted to respective input terminals (ENB, not shown) of the flip flops 72(1), 72(2), . . . , 72(n) of the third array. In the case where the resolution change signals U1, U2 represent the respective values 1, 1, i.e., the resolution of 150 dpi, the selecting switch 76 selects the output terminal 3, so that the source voltage is inputted to respective input terminals (ENB, not shown) of the flip flops 73(1), 73(2), . . . , 73(n) of the fourth array.

Here, an operation of the shift registers 68 that corresponds to each of the four degrees of reading resolution is explained. In the case of the resolution of 1,200 dpi (i.e., the highest degree of resolution in the present embodiment), the first array of flip flops 70(1), 70(2), . . . , 70(n) are operated. More specifically described, at respective timings when the CLK signal iteratively falls after the SP signal is inputted to the first flip flop 70(1), the switching elements 62(1), 62(2), . . . , 62(n) are sequentially turned ON, one by one, to connect the corresponding change storing portions 60 each to the output signal line 63. Thus, the electric charges (i.e., electric signals) stored by the charge storing portions 60 (more specifically, the capacitors 61) are outputted as an image signal representing a read image at the highest resolution of 1,200 dpi.

In the case of the resolution of 600 dpi, the second array of flip flops 71(1), 71(2), . . . , 71(n) are operated. More specifically described, at respective timings when the CLK signal iteratively falls after the SP signal is inputted to the first flip flop 71(1), the switching elements 62(1), 62(2), . . . , 62(n) are sequentially turned ON, two by two, to connect the corresponding change storing portions 60 each to the output signal line 63. Thus, the electric charges stored by the charge storing portions 60 are outputted as an image signal representing a read image at the resolution of 600 dpi.

In the case of the resolution of 300 dpi, the third array of flip flops 72(1), 72(2), . . . , 71(n) are operated. More specifically described, at respective timings when the CLK signal iteratively falls after the SP signal is inputted to the first flip flop 72(1), the switching elements 62(1), 62(2), . . . , 62(n) are sequentially turned ON, four by four, to connect the corresponding change storing portions 60 each to the output signal line 63. Thus, the electric charges stored by the charge storing portions 60 are outputted as an image signal representing a read image at the resolution of 300 dpi.

In the case of the resolution of 150 dpi, the fourth array of flip flops 73(1), 73(2), . . . , 73(n) are operated. More specifically described, at respective timings when the CLK signal iteratively falls after the SP signal is inputted to the first flip flop 73(1), the switching elements 62(1), 62(2), . . . , 62(n) are sequentially turned ON, eight by eight, to connect the corresponding change storing portions 60 each to the output signal line 63. Thus, the electric charges stored by the charge storing portions 60 are outputted as an image signal representing a read image at the resolution of 150 dpi.

The image signal is outputted as the output signal AO to the ASIC 30. As described above, the resolution confirm signal is outputted by the resolution confirm signal producing portion 66, before the image signal is outputted. Therefore, the image signal follows the resolution confirm signal, as shown in FIG. 8.

Figure 10:
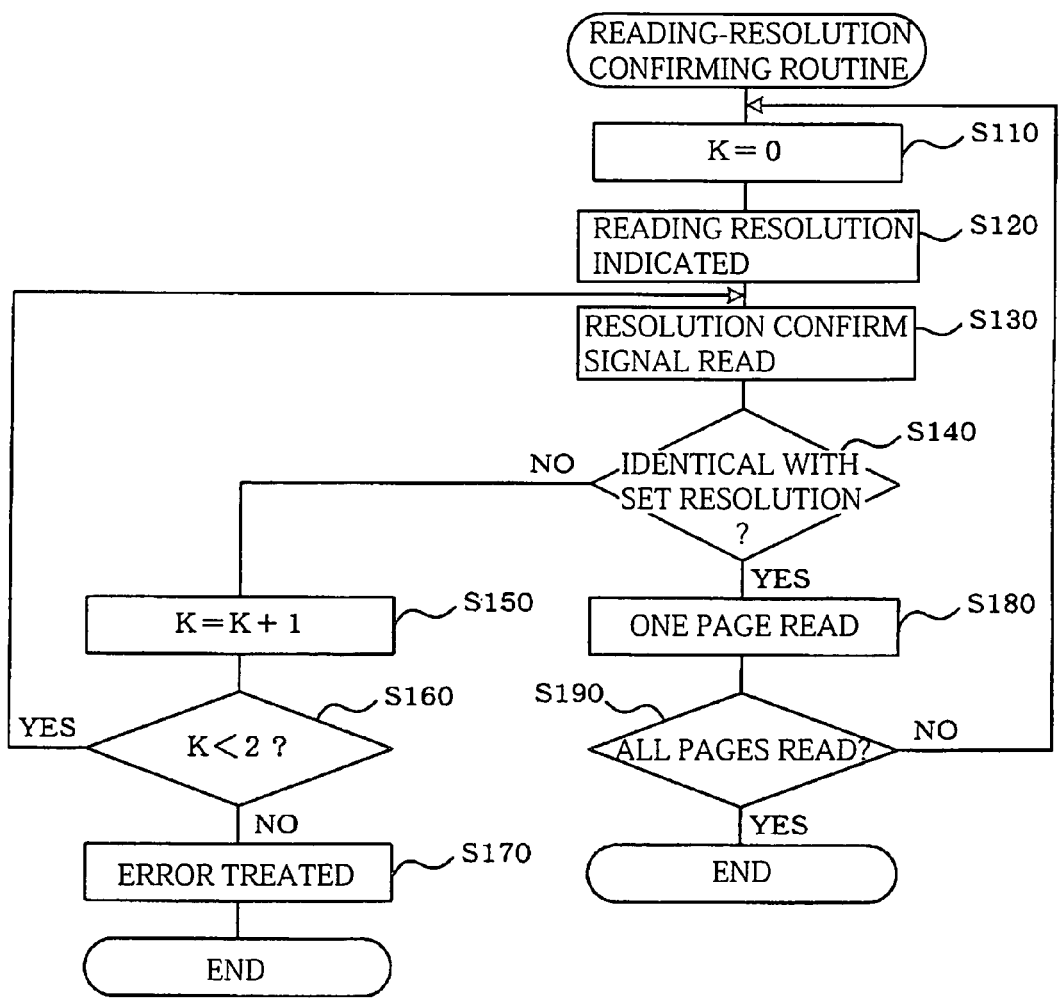
FIG. 10 is a flow chart representing a reading-resolution confirming routine.

Next, there will be described a reading-resolution confirming operation of the CPU 38 of the ASIC 30, by reference to the flow chart shown in FIG. 10. This operation is started when a user operates the operation panel 2 to start reading a document.

In the reading-resolution confirming operation, first, at Step S110, the CPU 38 resets a value of a counter, K, to 0 (i.e., K=0). Subsequently, at Step S120, the CPU 38 outputs the set resolution data representing the reading resolution set by the user. As described previously, the set resolution data is inputted to the waveform producing portion 32 and subsequently, when the SP signal produced by the start-signal producing portion, not shown, takes the high level, the CLK signal is changed to have the frequency selected based on the set resolution data, so that the set resolution is indicated from the ASIC 30 to the image reader 12.

Then, at Step S130, the CPU 38 reads the resolution confirm signal. As described above, the resolution confirm signal leads the image signal, and is outputted as the output signal AO from the image reader 12 to the ASIC 30. The output signal AO is subjected to the A/D conversion by the A/D converter 34, and the thus converted signal AO is stored by the memory (i.e., the line buffer, not shown) of the image processing portion 36. Thus, at Step S130, the CPU 38 reads the resolution confirm signal by reading the first two bit data stored by the memory of the image processing portion 36. The CPU 38 needs to read the resolution confirm signal at a timing after the signal is outputted from the image reader 12 to the ASIC 30. This timing may be indicated by interruption from the image processing portion 36 to the CPU 38.

After, at Step S130, the CPU 38 reads the resolution confirm signal, the control of the CPU 38 proceeds with Step S140 to judge whether the resolution represented by the thus read resolution confirm signal is identical with the set resolution, i.e., the resolution that is represented by the number of pulse falls of the CLK signal during the time duration in which the SP signal takes the high level and is indicated to the image reader 12.

If, at Step S140, it is judged that the resolution represented by the thus read resolution confirm signal is not identical with the set resolution, the control goes to Step S150 to add one to the value of counter K (i.e., K=K+1). Then, at Step 160, the CPU 38 judges whether the value of counter K is smaller than two (i.e., K<2?).

If, at Step S160, it is judged that the value of counter K is smaller than two, that is, that the value of counter K is one (i.e., K=1), the control goes back to Step S130 to read once more the resolution confirm signal and then to Step S140 to judge whether the resolution represented by the thus read resolution confirm signal is identical with the set resolution. If, at Step S140, it is judged again that the resolution represented by the resolution confirm signal is not identical with the set resolution, the control goes to Step S150 to add one to the value of counter K, so that the value of counter K is increased to two (i.e., K=2). Thus, at Step S160, it is judged that the value of counter K is not smaller than two, and the control goes to Step S170.

At Step S170, the CPU 38 treats an error that the resolution has not normally been indicated to the image reader 12. More specifically described, the CPU 38 controls a liquid crystal display (LCD) of the operation panel 2 to display a message "RESOLUTION HAS NOT NORMALLY BEEN INDICATED", and additionally controls a buzzer, not shown, of the complex apparatus 1 to produce an alarm sound. Then, the CPU 38 terminates the current reading resolution confirming operation, and controls the image processing portion 36 not to process the image represented by the image signal received thereafter from the image reader 12. That is, the CPU 38 judges that the resolution has not normally been indicated by the ASIC 30 to the image reader 12, and aborts the current image reading operation.

On the other hand, if, at Step S140, it is judged that the resolution represented by the resolution confirm signal is identical with the set resolution, the control goes to Step S180 to read an image corresponding to one page of the document. More specifically described, the CPU 38 indicates, to the image processing portion 36, start and end addresses in the memory of the same 36, so that the processing portion 36 processes, and thereby reads, only the data stored between the start and end addresses in the memory. In other words, the CPU 38 controls the image processing portion 36 not to read the first two bit data in each line, i.e., the resolution confirm signal. In addition, the CPU 38 judges whether reading of one page of the document has been finished, based on a detected condition of that page and, if a positive judgment is made, the control goes to Step S190.

At Step S190, the CPU 38 judges whether reading of all pages of the document to be read have been finished. If a negative judgment is made at Step S190, the control goes back to Step S110 to carry out the same operation on another page of the document. Thus, the present reading apparatus 1 can set a reading resolution for each page of a document, and can confirm, one time, the reading resolution set for the each page. On the other hand, if, at Step S190, it is judged that all pages of the document have been read, the CPU 38 terminates the current reading resolution confirming routine.

Thus, in the present image reading apparatus 10, the waveform producing portion 32 of the ASIC 30 changes the frequency of the CLK signal during the time duration in which the SP signal takes the high level, and thereby indicates the set resolution to the image reader 12.

In the image reader 12, the resolution change signal producing portion 64 produces the resolution change signals U1, U2 that cooperate with each other to represent the resolution corresponding to the number of pulse falls of the CLK signal during the time duration in which the SP signal takes the high level, and outputs the signals U1, U2 to the shift registers 68, thereby selecting the reading resolution of the image reader 12. In addition, the resolution confirm signal producing portion 66 produces, at the respective timings when the CLK signal falls for the first and second times after the SP signal falls down to the low level, the respective resolution confirm signals that cooperate with each other to represent the resolution corresponding to the signals U1, U2, and outputs the resolution confirm signals to the ASIC 30. The shift registers 68 commence, at the timing when the CLK signal falls for the third time after the SP signal falls down to the low level, operating the switching elements 62 in the manner corresponding to the signals U1, U2, thereby reading one line in the image on the document. Thus, the resolution confirm signal and the image signal are outputted as the output signal AO from the image reader 12 to the ASIC 30.

The SP signal outputted from the ASIC 30 to the image reader 12 is for indicating, to the image reader 12, commencement of reading of each line in an image. Therefore, for each line, one resolution is indicated from the ASIC 30 to the image reader 12, so that resolution change signals U1, U2 and resolution confirm signals are produced and outputted for the each line. In the case where a full-color image is read, three image reading operations are carried out, independent of each other, using the light source 26 including red (R), green (G), and blue (B) LEDs (light emitting diodes). In this case, too, an SP signal is used to indicate, to the image reader 12, commencement of reading of each line in the full-color image, so that resolution confirm signals lead each of the three image signals corresponding to the R, G, and B colors.

In the ASIC 30, the A/D converter 34 converts the analog image signal received from the image reader 12, into the digital image signal, and the image processing portion 36 extracts the resolution confirm signals from the image signal. Based on the thus extracted resolution confirm signals, the CPU 38 judges whether the set resolution has normally been indicated from the waveform producing portion 32 to the image reader 12. If it is judged that the set resolution has normally been indicated to the image reader 12, the image processing portion 36 processes one page of image represented by the image signal at the set resolution. That is, the ASIC 30 confirms the reading resolution at the beginning of reading of each page of image. However, if the resolution represented by the resolution confirm signals is not identical with the set resolution, the ASIC 30 once more confirms the resolution based on the following resolution confirm signals, received from the image reader 12. If another negative judgment is obtained, the ASIC 30 judges that the set resolution has not normally been indicated to the image reader 12, and aborts the current image reading operation.

As is apparent from the foregoing description of the image reading apparatus 10, the ASIC 30 provides a controller; the waveform producing portion 32 of the ASIC 30 provides an indicating portion; the CPU 38 of the ASIC 30 provides a judging portion and a controlling portion; and the charge storing portions 60, the switching elements 62, the resolution change signal producing portion 64, and the shift register 68 cooperate with each other to provide a reading portion of the image reader.

In the illustrated image reading apparatus 10, if it is judged that the set reading resolution has not normally been indicated from the ASIC 30 to the image reader 12, the current image reading operation is aborted to prevent the image from being read at an erroneous reading resolution. Even if it may be judged that the resolution represented by one resolution-confirm signal produced when one line of the image is read is not identical with the set reading resolution, the ASIC 30 makes another judgment based on another resolution-confirm signal that is produced when the next line of the image is read. Therefore, the ASIC 30 can prevent itself from erroneously aborting the current image reading operation, when the resolution represented by one confirm signal is just temporarily judged to be not identical with the set resolution, because of, e.g., noise.

In addition, in the illustrated image reading apparatus 10, the SP and CLK signals outputted from the ASIC 30 to the image reader 12 are utilized by the ASIC 30 to indicate the set reading resolution to the image reader 12. Therefore, there is no need to employ an additional signal line for the ASIC 30 to indicate the set resolution to the image reader 12, which leads to decreasing the production cost of the apparatus 10. Moreover, since the set resolution is indicated by utilizing the number of pulses of the CLK signal during the time duration in which the SP signal takes the high level, each one of the multiple degrees or steps of resolution can be easily indicated from the ASIC 30 to the image reader 12.

In particular, in the illustrated image reading apparatus 10, the time duration in which the SP signal takes the high level is unchangeable, and the frequency of the CLK signal is changeable to select each one of the multiple steps of resolution. Therefore, as compared with the prior reading apparatus, disclosed by the previously-identified Japanese Patent Publication No. 2000-101803, in which the pulse width of the SP signal is increased, the time duration needed by the image reader 12 before the commencement of each image reading operation can be made shorter.

While the present invention has been described in its preferred embodiment, it is to be understood that the present invention may otherwise be embodied.

For example, in the illustrated image reading apparatus 10, the set reading resolution is indicated by utilizing the number of pulse falls of the CLK signal during the time duration in which the SP signal takes the high level. However, it is possible to employ a different manner. For example, the set resolution may be indicated by utilizing the number of pulse rises of the CLK signal during the time duration. Otherwise, the set resolution may be indicated by utilizing a different characteristic (e.g., a frequency itself of the CLK signal than the number of pulse falls or rises. However, the number of pulse falls or rises is preferable because that number can be identified with a considerably simple electric circuit.

It is to be understood that the present invention may be embodied with various changes and improvements that may occur to a person skilled in the art, without departing from the spirit and scope of the invention defined in the appended claims.

What is claimed is:

1. An image reading apparatus, comprising:
an image reader which reads an image, and outputs an image signal representing the read image, to a signal line; and
a controller which includes an indicating portion indicating a first reading resolution to the image reader, so that the image reader reads the image at the first reading resolution, and which receives the image signal from the image reader via the signal line,
the image reader including a confirmation-signal producing portion which produces a resolution confirmation signal representing a second reading resolution which should be identical, when the first reading resolution has normally been indicated by the controller to the image reader, with the first reading resolution indicated by the controller, and outputs the resolution confirmation signal to the controller,
the controller including a judging portion which receives the resolution confirmation signal from the image reader, and judges whether the second reading resolution represented by the received resolution confirmation signal is identical with the first reading resolution indicated to the image reader, and thereby judges whether the first reading resolution has normally been indicated to the image reader.

2. The image reading apparatus according to claim 1, wherein the controller includes a controlling portion which controls, when the judging portion judges that the first reading resolution has not normally been indicated to the image reader, the image reader to stop reading the image.

3. The image reading apparatus according to claim 1, wherein the indicating portion of the controller indicates the first reading resolution to the image reader via the signal line, and wherein the confirmation-signal producing portion of the image reader outputs the resolution confirmation signal to the controller via the signal line.

4. The image reading apparatus according to claim 3, wherein before the image reader outputs the image signal to the controller via the signal line, the confirmation-signal producing portion of the image reader outputs the resolution confirmation signal to the controller via the signal line.

5. The image reading apparatus according to claim 1, wherein the image reader reads each one of a plurality of lines in the image, in a corresponding one of a plurality of image reading operations, and wherein each time the image reader performs one of the image reading operations, the indicating portion of the controller indicates the first reading resolution to the image reader.

6. The image reading apparatus according to claim 5, wherein each time the image reader performs said one of the image reading operations, the indicating portion of the controller indicates the first reading resolution to the image reader, and the confirmation-signal producing portion of the image reader outputs, to the controller, a corresponding one of a plurality of said resolution confirmation signals which represents a corresponding one of a plurality of said second reading resolutions, and wherein the judging portion of the controller judges, when the judging portion judges that said one second reading resolution represented by said one resolution confirmation signal is not identical with the first reading resolution, whether a next one of the second reading resolutions which is represented by a next one of the resolution confirmation signals is identical with the first reading resolution, and the judging portion judges, when the judging portion judges that said next second reading resolution represented by said next resolution confirmation signal is not identical with the first reading resolution, that the first reading resolution has not normally been indicated to the image reader.

7. The image reading apparatus according to claim 6, wherein the controller discards, when the judging portion thereof judges that the first reading resolution has not normally been indicated to the image reader, the image signal received thereafter from the image reader.

8. A method of confirming that a first reading resolution has normally been indicated by a controller to an image reader, the image reader reading an image, and outputting an image signal representing the read image, to the controller, via a signal line, the controller indicating the first reading resolution to the image reader, so that the image reader reads the image at the first reading resolution, and receiving the image signal from the image reader via the signal line, the method comprising the steps of:
producing, with the image reader, a resolution confirmation signal representing a second reading resolution which should be identical, when the first reading resolution has normally been indicated by the controller to the image reader, with the first reading resolution indicated by the controller, and outputting the resolution confirmation signal from the image reader to the controller, and
receiving, with the controller, the resolution confirmation signal from the image reader, and judging whether the second reading resolution represented by the received resolution confirmation signal is identical with the first reading resolution indicated by the controller to the image reader, thereby judging whether the first reading resolution has normally been indicated by the controller to the image reader.

9. The method according to claim 8, further comprising a step of controlling, with the controller, the image reader to stop reading the image, when it is judged that the first reading resolution has not normally been indicated by the controller to the image reader.

10. The method according to claim 8, further comprising a step of indicating, with the controller, the first reading resolution to the image reader via the signal line, wherein the step of outputting the resolution confirmation signal comprises outputting the resolution confirmation signal from the image reader to the controller via the signal line.

11. The method according to claim 10, wherein the step of outputting the resolution confirmation signal comprises outputting, before the image reader outputs the image signal to the controller via the signal line, the resolution confirmation signal from the image reader to the controller via the signal line.

12. The method according to claim 8, further comprising a step of reading, with the image reader, each one of a plurality of lines in the image, in a corresponding one of a plurality of image reading operations, and a step of indicating, with the controller, the first reading resolution to the image reader, each time the image reader performs one of the image reading operations.

13. The method according to claim 12, wherein the step of indicating comprises indicating, with the controller, the first reading resolution to the image reader each time the image reader performs one of the image reading operations, and the step of outputting the resolution confirmation signal comprises outputting, from the image reader to the controller, a corresponding one of a plurality of said resolution confirmation signals which represents a corresponding one of a plurality of said second reading resolutions, and wherein the method further comprises a step of judging, with the controller, and when it is judged that said one second reading resolution represented by said one resolution confirmation signal is not identical with the first reading resolution, whether a next one of the second reading resolutions which is represented by a next one of the resolution confirmation signals is identical with the first reading resolution, and judging, when it is judged that said next second reading resolution represented by said next resolution confirmation signal is not identical with the first reading resolution, that the first reading resolution has not normally been indicated by the controller to the image reader.

14. The method according to claim 13, further comprising a step of discarding, with the controller, and when it is judged that the first reading resolution has not normally been indicated by the controller to the image reader, the image signal received thereafter from the image reader.

* * * * *